April 29, 1924.

I. S. ROSENFELS 1,491,923

INSERTING MACHINE

Filed May 1, 1922

9 Sheets-Sheet 1

Inventor
Irwin S. Rosenfels
By Chindahl Parker Carlson
Attys

April 29, 1924.

I. S. ROSENFELS 1,491,923

INSERTING MACHINE

Filed May 1, 1922

9 Sheets-Sheet 4

Inventor
Irwin S. Rosenfels.
By Chindahl Parker Tailor
Attys

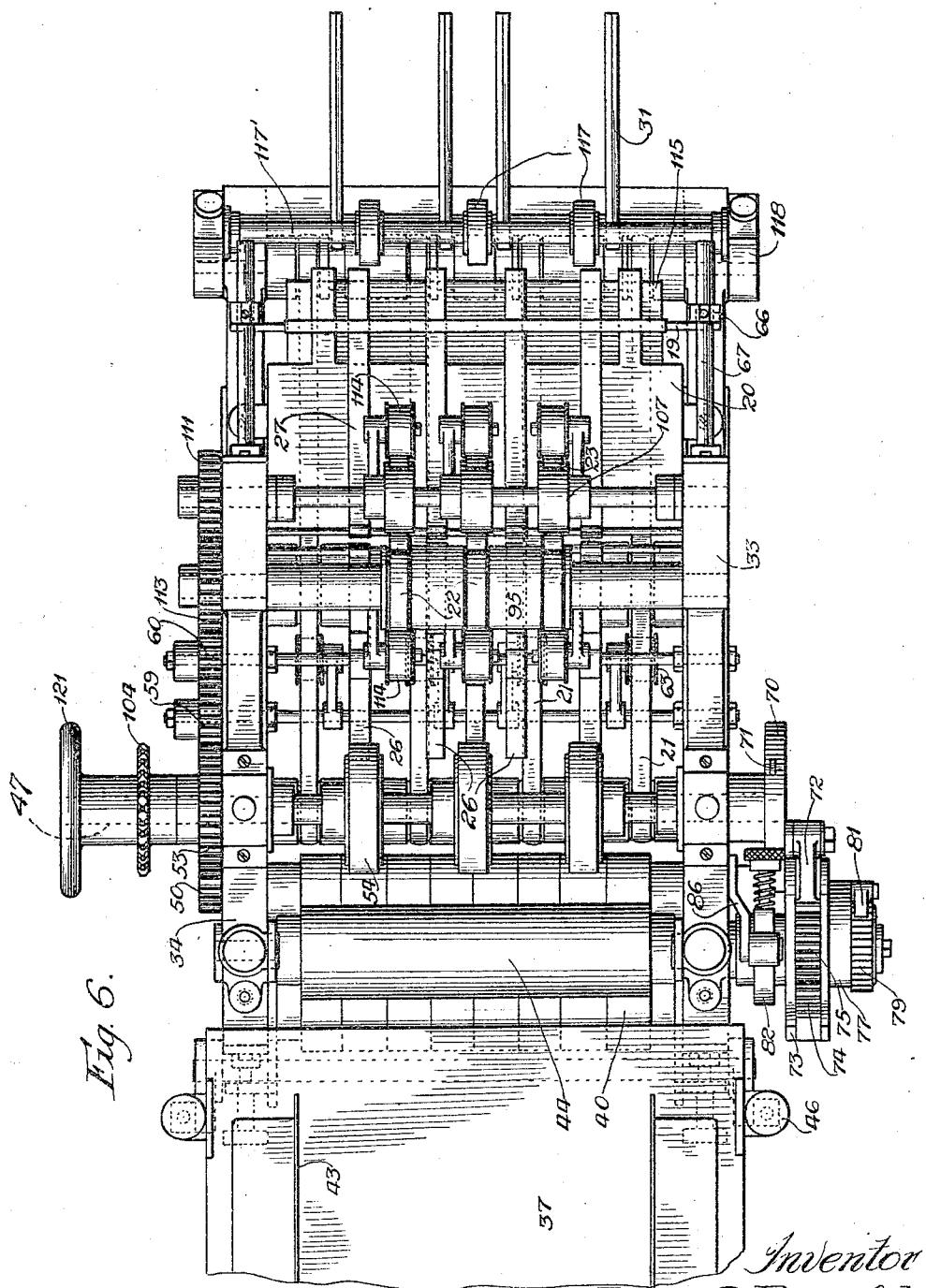

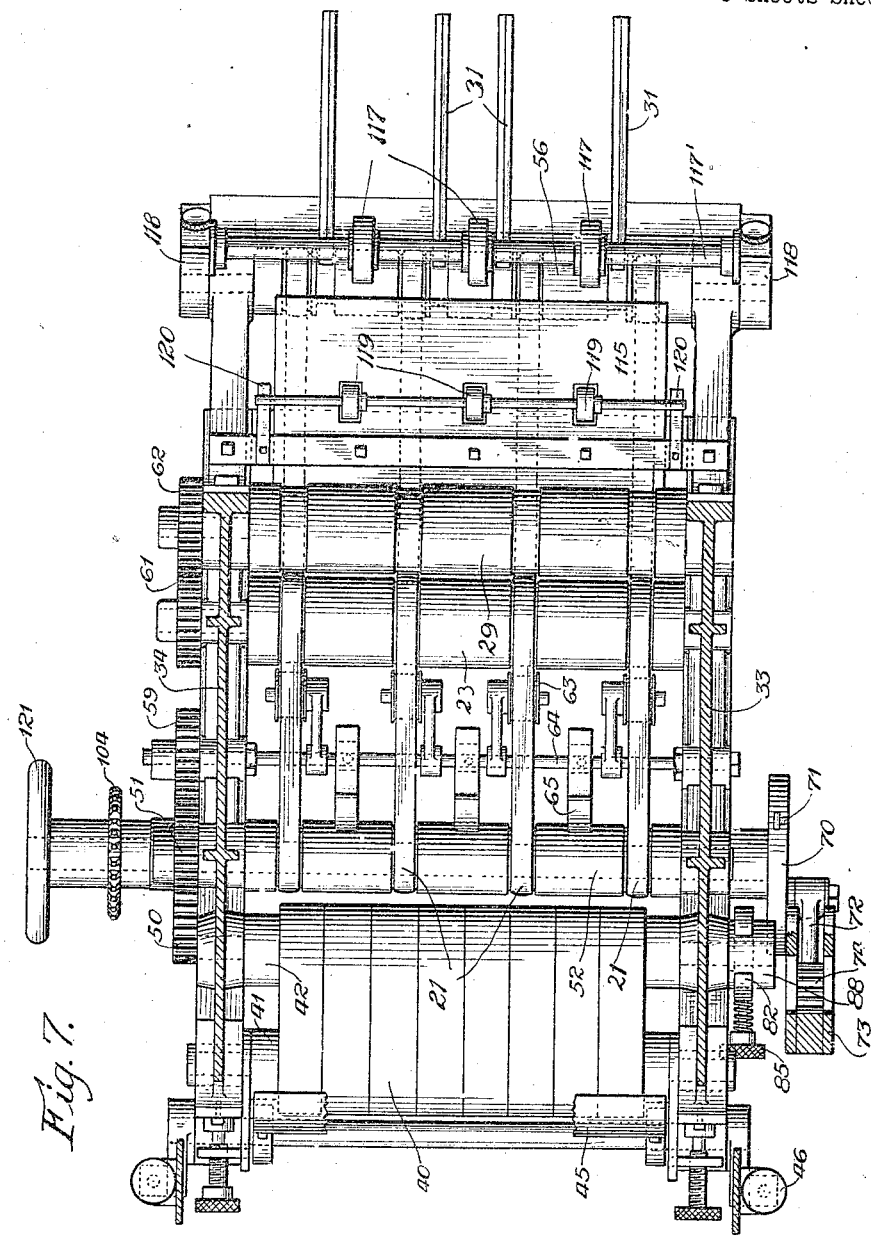

April 29, 1924.
I. S. ROSENFELS
INSERTING MACHINE
Filed May 1, 1922
1,491,923
9 Sheets-Sheet 7
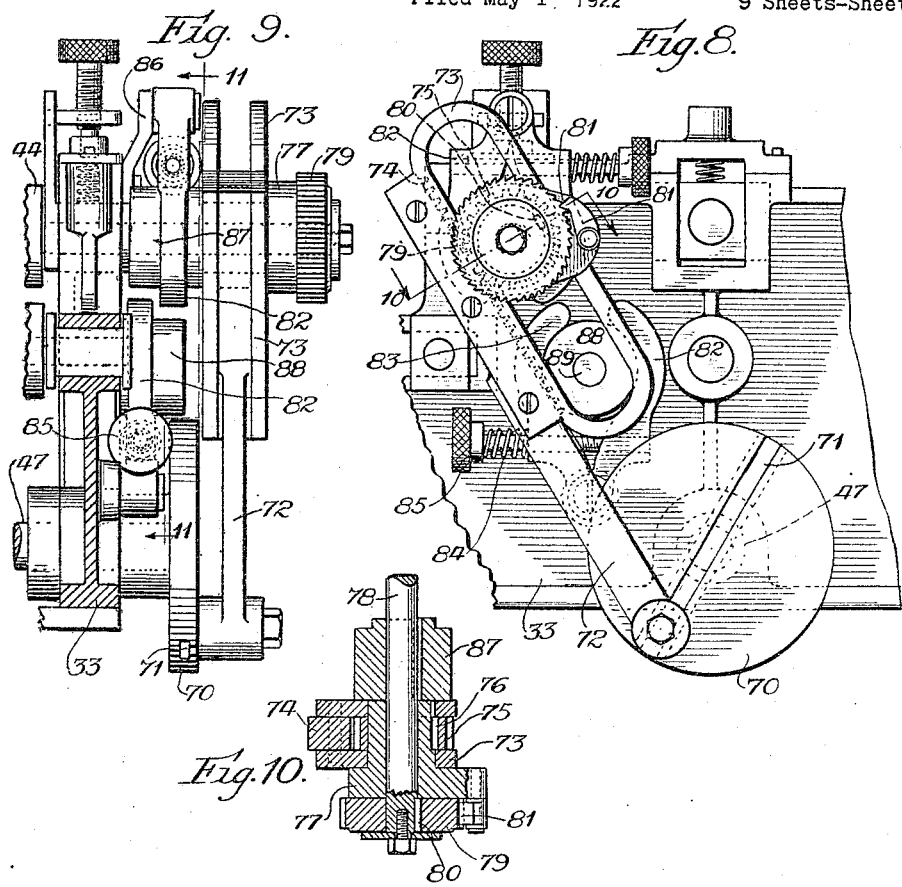
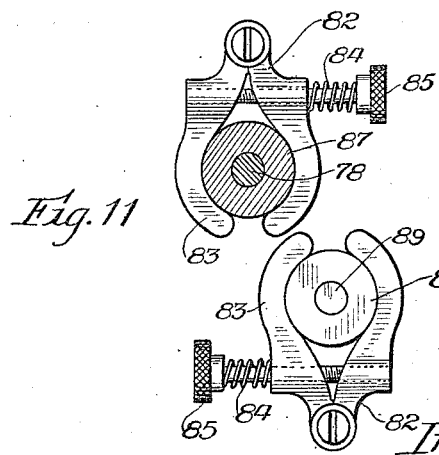
Inventor
Irwin S. Rosenfels.
By Chindahl Parker Carlson
Attys April 29, 1924.
I. S. ROSENFELS
INSERTING MACHINE
Filed May 1, 1922
1,491,923
9 Sheets-Sheet 8
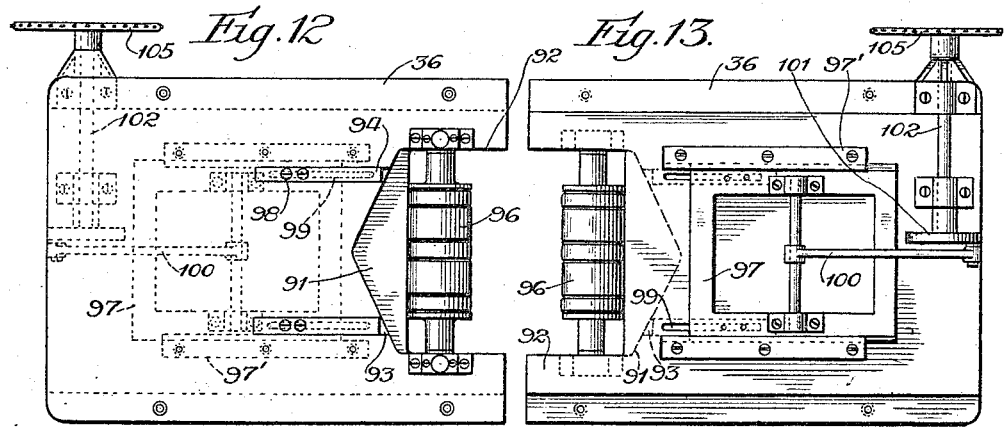
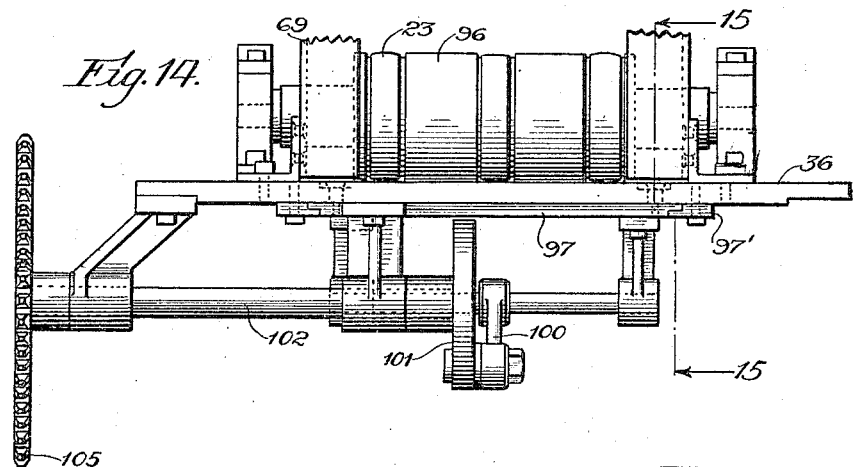
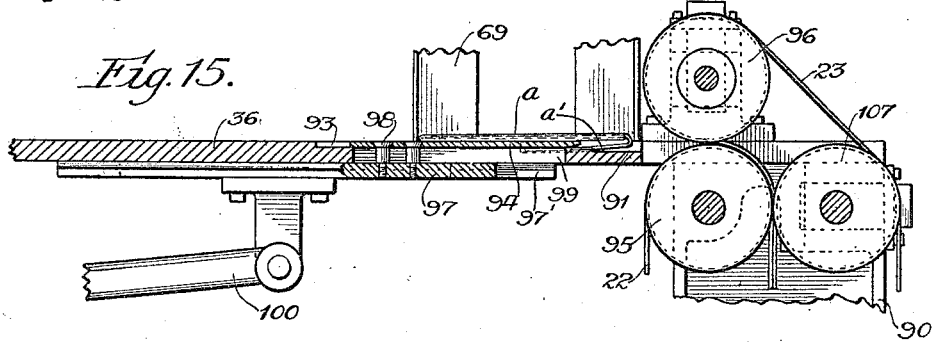
Inventor
Irwin S. Rosenfels.

April 29, 1924.

I. S. ROSENFELS 1,491,923

INSERTING MACHINE

Filed May 1, 1922

9 Sheets-Sheet 9

Inventor
Irwin S. Rosenfels.
By Chindahl Parker Failer
Attys

Patented Apr. 29, 1924.

1,491,923

UNITED STATES PATENT OFFICE.

IRWIN S. ROSENFELS, OF CHICAGO, ILLINOIS, ASSIGNOR TO SEARS, ROEBUCK AND CO., OF CHICAGO, ILLINOIS, A CORPORATION OF NEW YORK.

INSERTING MACHINE.

Application filed May 1, 1922. Serial No. 557,700.

*To all whom it may concern:*

Be it known that I, IRWIN S. ROSENFELS, a citizen of the United States, residing at Chicago, in the county of Cook and State of Illinois, have invented a certain new and useful Inserting Machine, of which the following is a specification.

This invention relates generally to a machine for automatically placing inserts in books, the invention being herein shown as embodied in a machine for automatically bringing into association a plurality of separate inserts and for depositing them into a catalog. It is an object of the invention to provide a machine arranged to select single inserts from a plurality of piles of inserts, for folding one of the inserts about another, and for feeding the associated inserts into a predetermined position to be dropped into an open catalog.

Another object of the invention is to provide a machine in which two inserts are fed into position perpendicular to each other, and in which one of the inserts so positioned is caused to act as a folding element or knife for folding the other insert about it, and also to provide a machine capable of quick and easy adjustment to accommodate various kinds or sizes of inserts.

A further object is to combine and correlate a catalog-binding machine and an inserting machine and to provide synchronous mechanism for presenting catalogs in open position successively to the inserting machine and for depositing in definite position in the catalogs successively an insert or a group of inserts.

Ancillary objects and advantages of the invention will be made apparent from the following detailed description.

Figure 1:
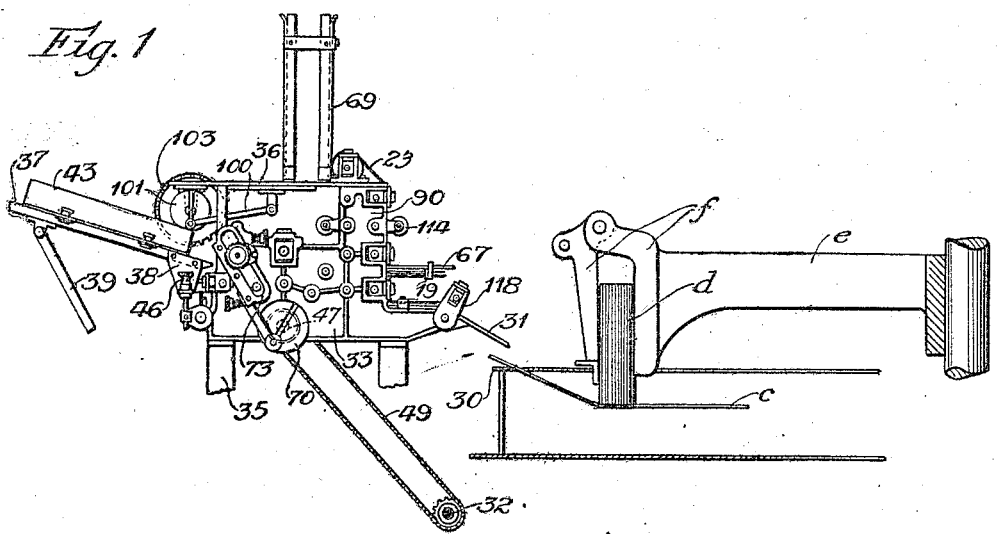
Figure 2:
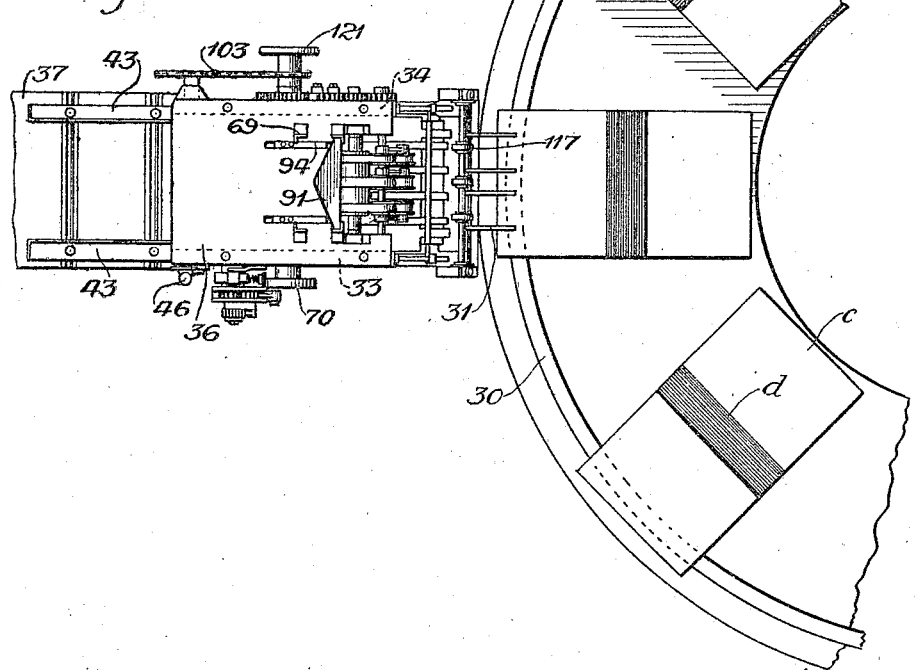
Figure 3:
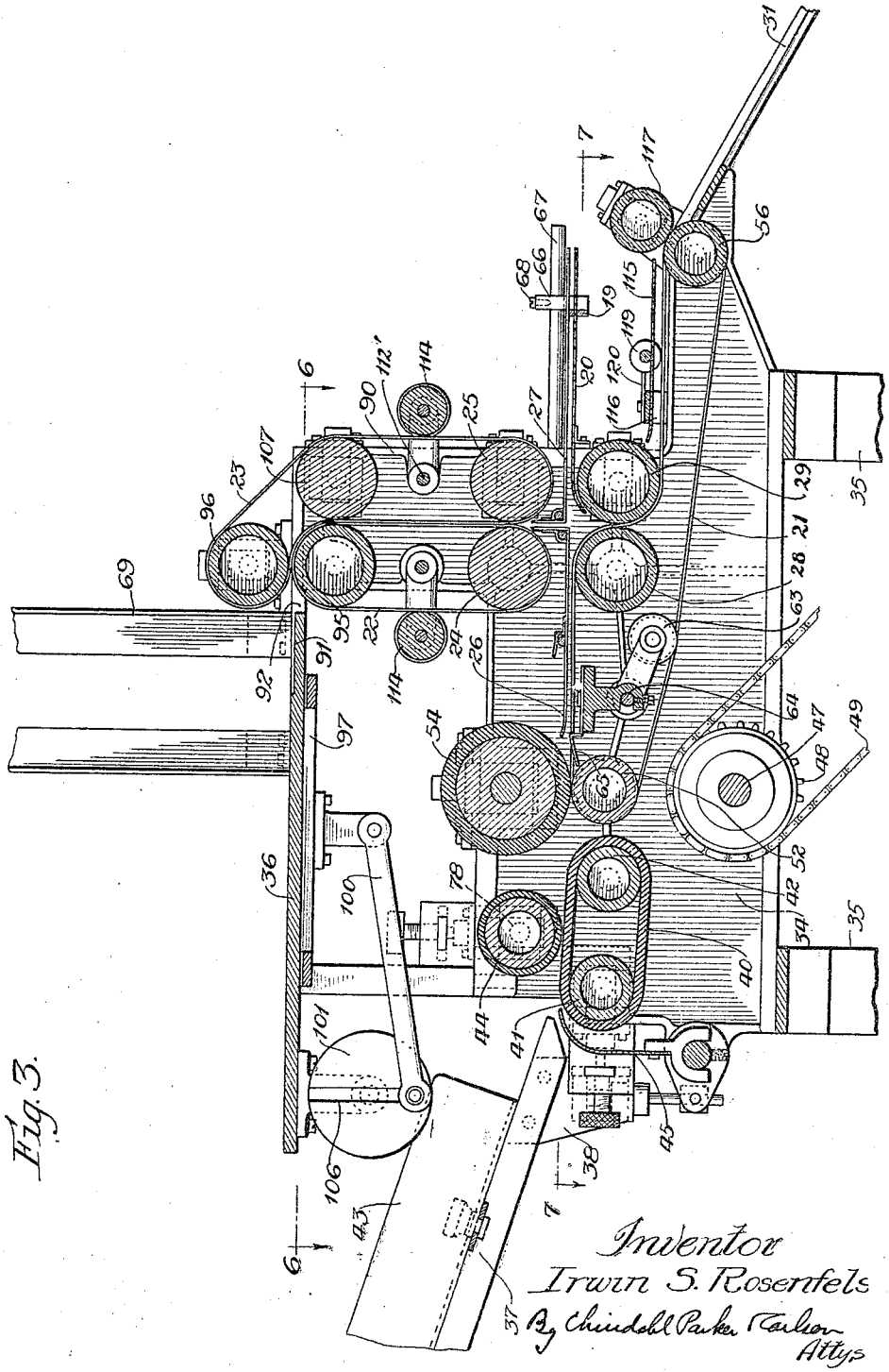
Figure 4:
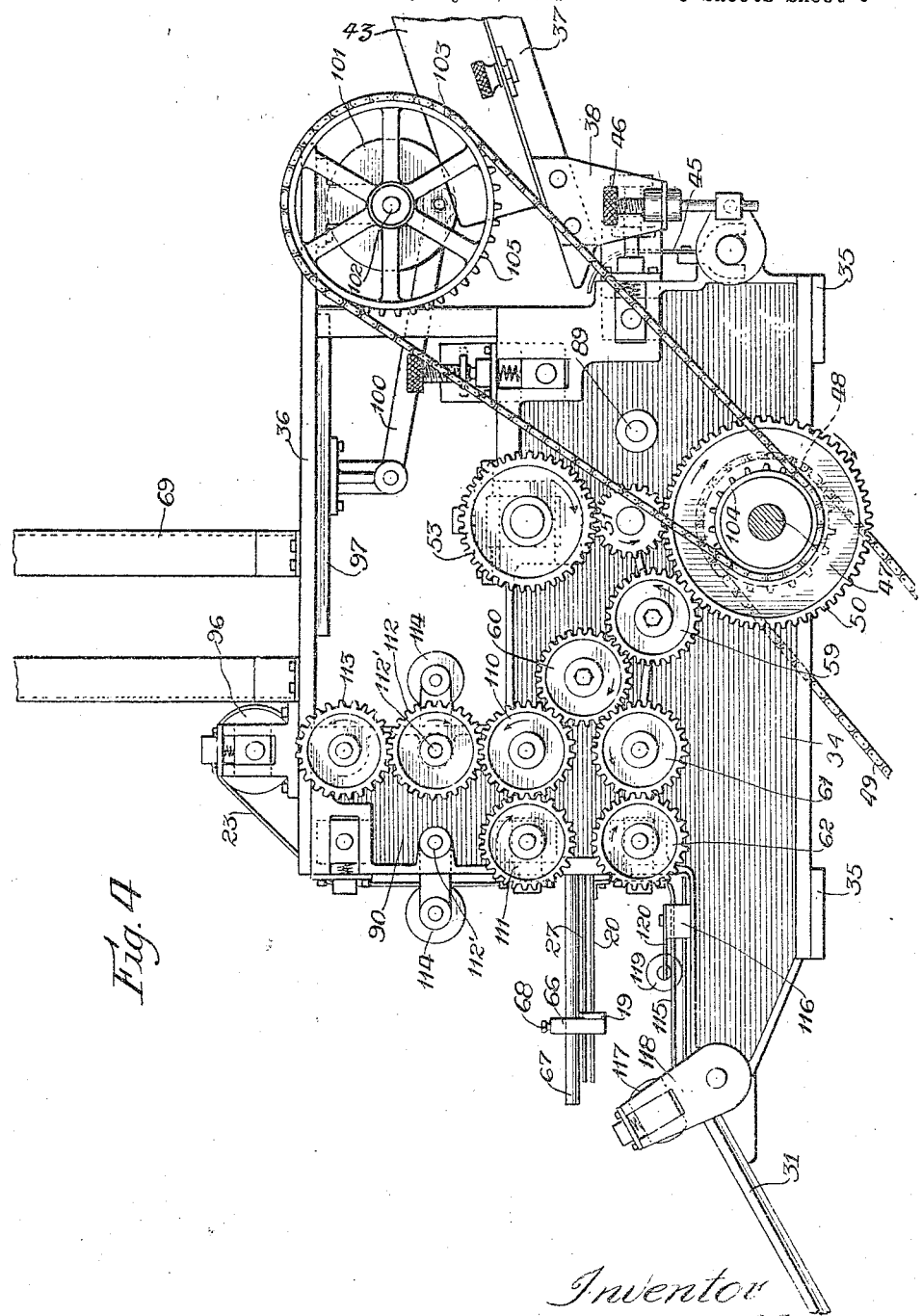
Figure 5:
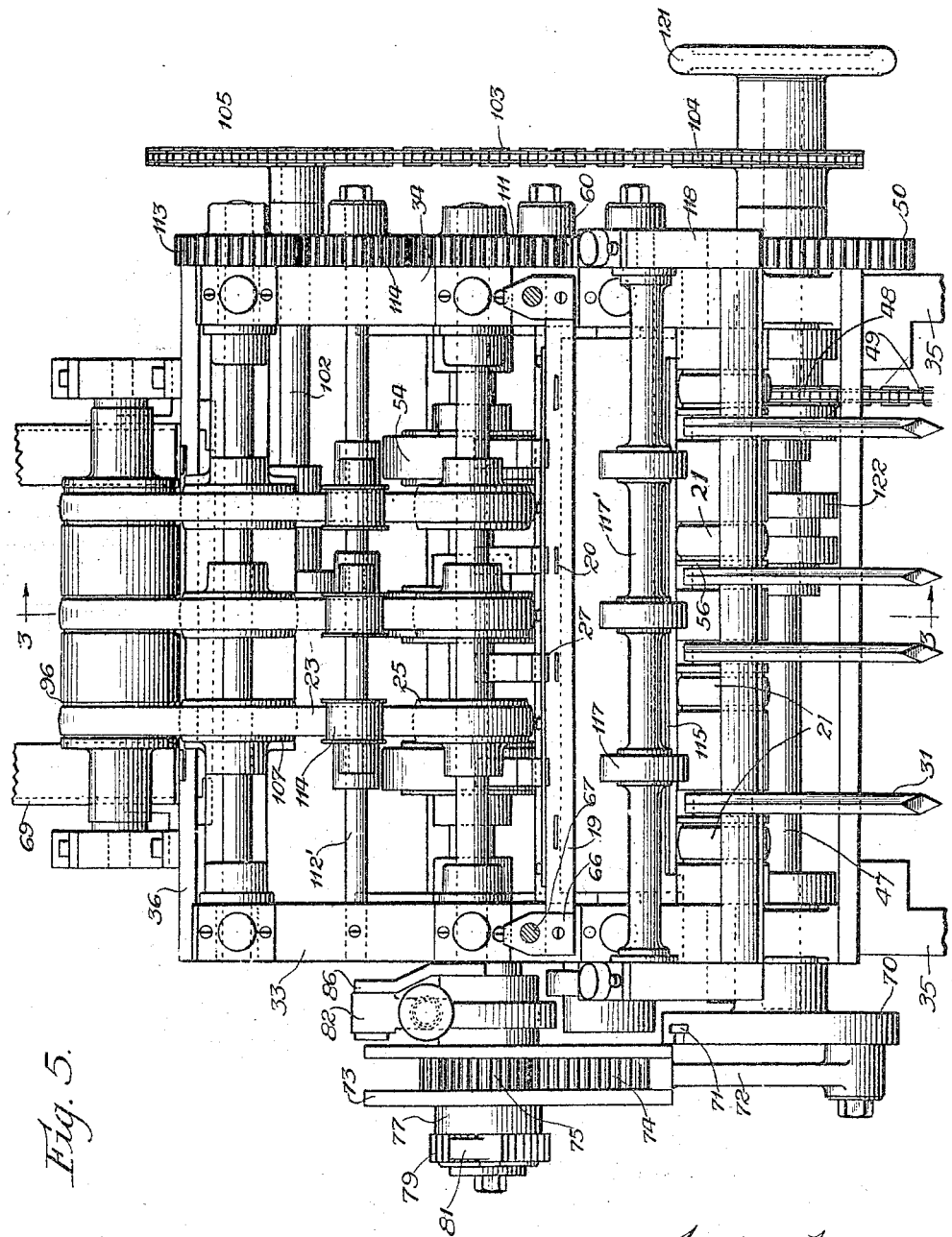
Figure 16:
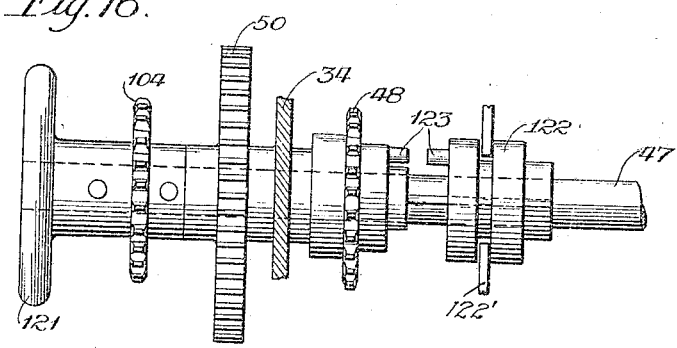
Figure 17:
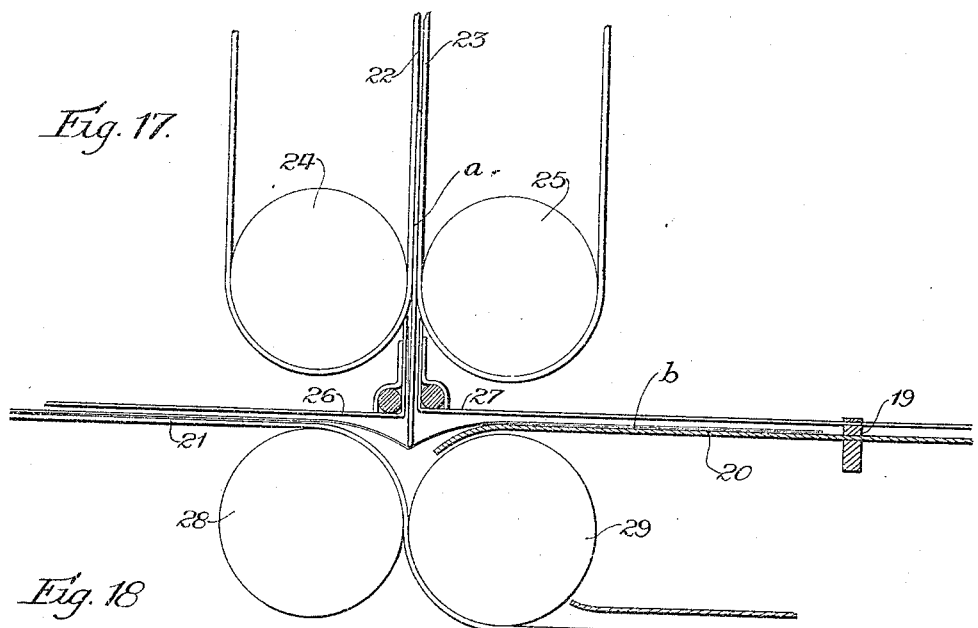
Figure 18:
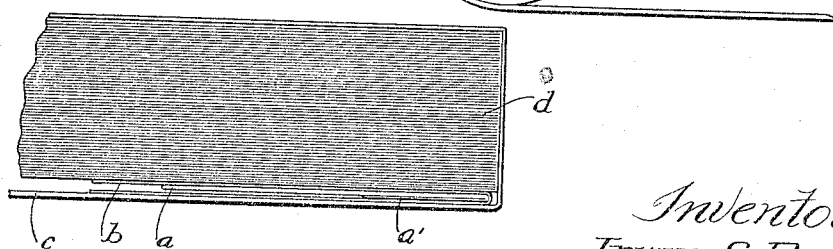

Referring to the drawings forming a part hereof, Figure 1 is a side elevation of the inserting machine shown in cooperative relation to a catalog-binding machine, the latter being shown rather diagrammatically. Fig. 2 is a plan view of Fig. 1 with the clamping jaws for holding the catalog fillers removed and showing several catalogs in the making as they are conveyed past the inserting machine to receive inserts therefrom. Fig. 3 is a longitudinal vertical section through the inserting machine proper. Figs. 4 and 5 are respectively a side elevation and an end view thereof. Fig. 6 is a plan view of the machine with the envelope magazine and appurtenant feeding mechanism removed, this view being taken approximately on the line 6—6 of Fig. 3. Fig. 7 is a similar view in horizontal section taken on the line 7—7 of Fig. 3. Fig. 8 is a side elevational detail of the intermittently operated blank feeder. Fig. 9 is an end view of Fig. 8. Fig. 10 is a transverse sectional detail taken on the line 10—10 of Fig. 8. Fig. 11 is a vertical sectional detail taken on the line 11—11 of Fig. 9. Figs. 12 and 13 are respectively a plan view of the top and undersides of the continuously operated envelope feeder, the envelope magazine being omitted in Fig. 12. Fig. 14 is an end view of Fig. 12 on a slightly enlarged scale. Fig. 15 is a fragmentary longitudinal sectional detail taken on the line 15—15 of Fig. 14. Fig. 16 is a fragmentary detail view of the main drive shaft and parts thereon, including the hand-operated means used in adjusting the machine. Fig. 17 is a diagrammatic view illustrating the manner in which the envelopes are fed to the blanks to fold the latter and cause the same to be fed with the envelope enclosed therein. Fig. 18 is an elevational view looking at the end of a catalog adjacent the back binding illustrating the manner in which the inserts are received in the catalogs.

Throughout the views the same reference numerals designate the same parts.

While my invention may be embodied in a machine for handling inserts of various sizes and kinds, I have chosen to illustrate herein a machine which is designed to handle two kinds of inserts, to wit, flat sheets of such thickness as to be readily foldable and envelopes, the machine comprising means for selecting successive inserts from each source of supply, for bringing the two inserts into association and for depositing the pairs of associated inserts successively in catalogs. Throughout the following description I will refer to these inserts as order blanks and envelopes but without any intention of limiting the invention to the handling of particular styles of inserts. Furthermore, the specific description of the preferred embodiment of the invention, which is herein shown by way of example, is intended only for the purpose of imparting an understanding of the invention, broadly speaking, and not as a limitation of the invention to the particular embodiment disclosed. The scope of the invention will be pointed out in the appended claims.

Before proceeding with the detailed specification of the machine reference is directed to Figs. 1, 2, 17 and 18 in connection with which the nature of the work performed by the machine will be outlined. In Fig. 17 the envelope $a$, which is preferably self-addressed for the convenience of the customer receiving the firm's catalog, is fed to the order blank $b$ which at the instant the envelope is moved into engagement therewith is lying stationary and registered in engagement with a stop 19 upon a ward plate 20. The blank $b$ having been fed upon the plate 20 by the continuously operating feed belt 21 is maintained by the belt under light friction in close contact with the stop 19. The envelope $a$ is fed under considerable friction by the continuously operating feed belts 22 and 23 on the pulleys 24 and 25. The envelope emerging from between the belts is prevented from being deflected upon engagement with the order blank $b$ by a pair of guides 26 and 27 and projects the blank $b$ at its intermediate portion down in between pulleys 28 and 29. The belt 21 passes over pulley 28 between it and the pulley 29. The latter cooperates with the belt 21 at the edge of and below the ward plate 20 to engage the projected portion of the order blank with the envelope therein to feed the two together out to be discharged upon the cover $c$ of a catalog where it finally reposes between the cover and the filler $d$ thereof as shown in Fig. 18.

The machine herein shown for binding the catalogs comprises a filler conveyer and a cover applying means. The former usually comprises an endless travelling conveyor with a plurality of filler-clamps $e$ between the jaws $f$ of which the fillers $d$ are held during the operations of applying adhesive to their backs and affixing the covers thereto. In Fig. 1 a clamp $e$ is illustrated with a filler $d$ between its jaws. The cover $c$ not having been folded or broken as yet, lies in distended relation with an edge projecting over and resting upon a special trackway 30 which I have provided and which extends beneath the discharge chute 31 of the inserting machine. The chute 31 preferably consists of square wooden bars placed edge up which avoid the sticking of the inserts thereon, due to static electricity. The trackway 30 is disposed at such an elevation relative to the catalogs on the conveyer that the cover inclines downwardly from the track 30 to the filler. In this way it is insured that as the inserts are discharged from the chute 31 they will move to the base of the crotch formed between the cover and the filler so that upon the subsequent folding of the cover the inserts will be held securely between the cover and the filler substantially as shown in Fig. 18.

The inserting machine, as shown in Fig. 1, is arranged to receive its power from a sprocket on the driven shaft 32 which preferably is a continuously rotating element of the catalog machine diagrammatically represented in this view. The inserting machine is thereby operated in synchronism with the catalog machine so that at the instant an insert is discharged a catalog will be presented beneath the chute to receive the same.

With this preliminary description of the general nature and functions of the machine I will now proceed to a more detailed description.

In the embodiment herein disclosed the main frame of the machine comprises two spaced side frames 33 and 34 joined on the bottom by suitable cross pieces supported on pedestals 35 and on the top by a table 36. A shelf or file 37 is supported at one end of the frame upon brackets 38 and is sustained by a prop 39 in tilted relation in front of a conveyer belt 40 rotatably mounted on pulleys 41 and 42. The pulley 41 is preferably adjustable outwardly with respect to the pulley 42 as shown in order to take up slack in the belt 40. A stack of order blanks is adapted to be placed upon the shelf 37 between a pair of laterally adjustable guide plates 43. The stack is fanned out so that the uppermost blanks lie with their leading edges upon the belt 40, the topmost blank being in frictional engagement with the intermittently operated feed roller 44. The latter is held under adjustable spring pressure preferably against the belt 40. A small guard 45 prevents blanks from moving down into the space between the belt 40 and the forward edge of the shelf 37. The forward edge of the latter may be elevated or lowered by adjustment of the screws 46.

A driven shaft 47 is journalled in the frame and carries a sprocket 48 over which runs a drive chain 49 driven from a sprocket on the shaft 32 of the catalog machine. The shaft 47 carries a spur gear 50 meshing with a pinion 51 for driving a feed belt pulley 52. A spur gear 53 meshing with the pinion 51 serves to drive large feed rollers 54 riding under spring pressure preferably upon the feed belts 21 passing over the pulleys 52. The feed belts 21, of which there are preferably four, pass over end pulleys 56 and between the intermediate pulleys 28 and 29. The latter are preferably driven through gears 59 and 60, the former of which meshes with the spur gear 50 and the latter with a gear 61 for driving the pulleys 28, the gear 61 in turn meshing with a gear 62 to drive the pulleys 29. The tension of the belts 21 is arranged to be maintained practically constant by idler pulleys 63 carried on the ends of brackets pivotally mounted on a rod 64 extending horizontally between the sides of the frame.

The order blanks as they are intermittently removed one by one from the stack in the operation of the roller 44, the means for the operation of which will be presently described, are received between the rollers 54 and the belts 21 to be fed across the machine toward the front end thereof. After passing the rollers 54 the blank is moved by slight friction with the belt beneath the horizontal leg of the guides 26 and over clips 65. The clips and the guides together prevent crinkling of the blanks as they are fed. After passing the pulleys 28 the blank enters upon the ward plate 20, the forward edge of which is curved to the contour of the pulleys 29 to insure the proper entry of the leading edge of the blank upon the plate between it and the horizontal leg of the guides 27. The plate 20 is preferably supported at its forward end by brackets on the sides of the frame as shown and at its rearward end is supported by tongues entering slots in the stop 19 to permit adjustment of the stop relative thereto. The stop 19 is provided by a rod carried by heads 66 which are longitudinally adjustable on the parallel bars 67 and arranged to be set by screws 68. The blank under the action of the belts 21 continues to move forwardly until it engages the stop 19 whereupon it remains stationary in registering contact therewith to await the arrival of an envelope a from the magazine 69.

The means for intermittently operating the feed roller 44 is preferably of a well-known type driven from a crank disk 70 on the driven shaft 47. The disk 70 has formed in the face thereof a diametrical slot 71. A rod 72 has its inner end adjustably secured in the slot 71 in order to permit of a variation in the stroke of the rod for a purpose presently to appear. The rod 72 at its outer end carries a slotted yoke 73 in the one side of which is provided a rack 74. The yoke 73 is mounted over a pinion 75 which meshes with the rack 74 and is keyed, as at 76, to a collar 77 rotatably mounted on the shaft 78 which drives the feed roller 44. The outer end of the shaft 78 carries a ratchet 79 made rigid therewith by means of a key 80. The ratchet 79 is connected so as to be operated through an arc in each revolution of the disk 70. The connection is afforded by a pawl 81 pivotally mounted on a stud projecting from an offset portion on the collar 77. The pawl 81 swings with the collar 77 and the pinion 75 upon each reciprocation of the yoke 73 thereby operating the feed roller 44 correspondingly through a certain angularity. Obviously as the end of the crank is adjusted in or out in the slot 71, the extent of reciprocation of the yoke is correspondingly decreased or increased, thereby effecting movement of the shaft 78 and hence the feed roller 44 through a correspondingly smaller or greater arc. The feed roller 44 is given approximately one turn upon each reciprocation of the yoke 73 and serves to pick off the topmost blank from the stack. The blank as it is fed off between the roller 44 and the belt 40 causes the latter to turn also due to the increased frictional engagement therewith by the roller 44 resulting from the interposition of a blank between the roller and the belt. In the event two blanks should move beneath the roller 44 at once, only the topmost is removed in a well-known manner. This operation of the belt serves in a measure also to advance the topmost blanks of the stack to the feed roller 44 so that they in turn are picked off in subsequent operations. The tilting of the shelf 37, of course, serves principally in advancing the blanks toward the feeding means.

In the operation of the feed roller 44 and the belt 40, especially where the machine is operated at comparatively high speeds, the momentum gathered by the roller 44 and its appurtenant operating elements and the pulleys 41 and 42 with the belt 40, would tend to impel these parts toward continued operation after a blank had been fed so that in further operations blanks would very likely be improperly advanced. To forestall this action I prefer to provide a pair of adjustable brakes 82 to place a constant drag upon the operation of the elements referred to. These brakes are illustrated in detail in Fig. 11 and preferably comprise pivoted jaws 83 the tensioning of which is produced by a coiled tension spring 84 adapted for adjustment suitably by screws 85. One of the brakes 82 is pivotally supported upon a bracket 86 secured upon the frame and its jaws cooperate with a friction collar 87 keyed upon the shaft 78 which carries the feed roller 44. The other brake is pivotally supported upon the frame and engages a friction collar 88 on the shaft 89 which carries the pulley 42. At the end of a reciprocation of the yoke 73 these elements are brought practically in an instant to a standstill, due to the drag placed upon the operation of the feed roller 44 and the pulleys 41 and 42 for the belt 40.

The envelope magazine 69 may be of any suitable form for holding a vertical stack of envelopes flap down upon the table 36. Herein the magazine is shown as made of an angle iron frame having four corner posts which, if desired, may be adjustable to accommodate different sizes of envelopes. The table 36 as is most clearly shown in Figs. 12 and 13 has a cut-away middle portion at its forward end where it is fastened to the upright portions 90 of the frame. The table 36 is recessed as at 91 adjacent the cut-away portion, designated 92, to receive the flap of the lowermost envelope in the stack carried in the magazine 69. Terminating in the recessed portion 91 are channels or grooves 93 in which are reciprocable a pair of fingers 94 the forward ends of which as shown in Fig. 15 are arranged to engage the said lowermost envelope by entering between the body of the envelope and the flap a′ thereof whereby to move the envelope from beneath the stack out between the feed belts 22 and 23 passing over the pulleys 95 and 96. The fingers 94 have connection with a frame 97 slidable between cleats 97′ on the underside of the table 36. The connection consists of screws 98 operating in slots 99 which are cut longitudinally in the channels 93 in the table 36 and terminate short of the recess 91. The frame 97 has connection through a rod 100 with a crank disk 101 on a countershaft 102 driven from the shaft 47 through a sprocket chain 103 passing over the sprockets 104 and 105 on the shafts 47 and 102, respectively (see Fig. 4). The inner end of the rod 100 is suitably adjustable in a diametrical slot 106 provided in the face of the crank disk 101 in order to permit of a variation in the length of the stroke of the fingers 94 in projecting the envelopes one at a time from beneath the stack in the magazine 69. An envelope as it engages between the belts 22 and 23 is directed along a new course vertically downwardly past a pulley 107 over which the belt 23 is made to pass. A pair of lower end pulleys 24 and 25 for the belts 22 and 23, respectively, are driven in turn to transmit driving effort to the belts, by means of gear 60 which meshes with a gear 110 driving the pulley 24, a similar gear 111 being arranged to mesh with the gear 110 whereby to drive the pulley 25 in the opposite direction to the pulley 24. An intermediate gear 112 meshing with the gear 113 transmits the driving force from the gear 110 of the pulley 24 for driving the pulley 95. It will be observed that the pulleys 96 and 107 are not driven positively but idly with the belts 23 because of the close frictional engagement between the belts 22 and 23, the belts 23 being, however, driven as aforesaid by the pulleys 25. To insure a constant tension of the belts 22 and 23, suitable idler pulleys 114 may be provided mounted in arms pivotally secured on the shafts 112′ in the upright portions 90 of the frame. The envelope passing downwardly between the belts 22 and 23 passes the pulleys 24 and 25 and enters between the vertical legs of the guides 26 and 27. As the leading edge of the envelope emerges from between the guides, it engages a blank lying in engagement with the stop 19, and being driven with considerable friction by the belts the envelope forces the intermediate portion of the blank downwardly past the edge of the plate 20 in between the pulleys 28 and 29. The pulleys 29 being in close frictional contact with the belts 21 engage the projected portion of the blank with the envelope therein and draw the two together downwardly at the same time completing the fold in the blank initiated by the envelope. The belts 21 passing between the pulleys 28 and 29 make an abrupt right-hand turn which insures the best possible pressing of the fold of the blank so that when the blank with the envelope enclosed therein emerges from beneath the roller 29, being conveyed upon the belts 21, there will be little tendency for the blank to unfold. In fact, the blank with the envelope therein may be regarded as a unit as it is discharged down the chute 31 into the catalog. A guide 115 supported on blocks 116 from the sides of the frame further insures against the unfolding of the blank as the latter passes finally beneath a set of rollers 117 operating on the belts 21 over the pulleys 56. The rollers 117 are suitably mounted on a shaft 117′ journalled in brackets 118 swingable on the sides of the frame. An intermediate traction roller 119 supported from the blocks 116 on leaf springs 120 serve to insure the passage of the blank and envelope together out under the rollers 117 and down the chute 31.

In adapting the machine to use in connection with different sizes of order blanks and different sizes of envelopes adjustment necessarily is made of the blank feeding and envelope feeding means. In making these adjustments it is necessary to turn the machine over by hand in order to ascertain whether the adjustments have been properly made. As shown in Fig. 16 I prefer to provide in connection with the driven shaft 47 and the driven sprocket 48 a hand wheel 121 rigid with the shaft and arranged to be operated when the clutch collar 122 splined on the driven shaft 47 is moved out of driving relation with the sprocket 48 by means of shift fingers 122′ or other suitable means. The sprocket 48 being continuously operated from the catalog machine is free to rotate upon the driven shaft 47 and communicates power thereto only upon the co-operation of clutch teeth 123 when the clutch collar is moved in the usual manner by the operator pressing a treadle (not shown). The hand wheel 121 it will be seen is readily engaged from the side of the machine and is of sufficient diameter to enable the operator to turn the machine over with comparatively little exertion.

While I have herein disclosed the preferred embodiment of my invention with considerable particularity for the sake of clearness, it will be understood that the invention is not limited to the embodiment herein disclosed since various adaptations and modifications of the invention will naturally occur to persons skilled in this art. In the appended claims it is therefore the endeavor to include all such legitimate modifications and adaptations as fall within the scope of the invention.

I claim as my invention:

1. The combination in a catalog handling mechanism of means for securing catalog fillers in covers adapted to hold said fillers upon the covers before the latter are folded or pressed, and means for feeding inserts onto said covers whereby when said covers are folded said inserts are held in between the covers and the fillers.

2. The combination in a catalog handling mechanism of means for feeding inserts in collected groups to be discharged at a certain point, means for feeding catalogs past said point, said catalogs being only partially completed with the cover thereof not folded or pressed and projecting inclined toward the filler forming a crotch therewith, said inserts being adapted to be discharged on said cover whereby the same move down by gravity snugly in the bottom of the crotch to be held securely between the fillers and the cover upon folding of the latter.

3. In catalog handling mechanism the combination of a trackway, means for conveying a catalog adjacent said trackway with the cover thereof in the process of being fastened to the filler thereof projecting over said trackway and supported thereby in inclined position, insert feeding means adjacent said trackway operated in synchronism with said catalog conveyor to discharge inserts upon said cover, said inserts being adapted to slide on said inclined covers into the crotch between the covers and the fillers to be therein held upon the closing of said cover.

4. In catalog handling mechanism, the combination of an insert feeder having a discharge chute, a trackway adjacent said chute, and means adapted to feed catalogs along said trackway with their covers open and resting upon said trackway to receive the inserts from said discharge chute whereby said covers when closed are adapted to hold said inserts.

5. In combination, means for causing open catalogs to travel continuously past an inserting mechanism, and an inserting mechanism comprising two means for supporting piles of inserts, two means for successively removing inserts from the respective piles, and mechanism for feeding successive pairs of inserts to a common point, for folding one insert about the other, and for delivering the successive pairs of associated inserts into the respective open catalogs as the latter pass by.

In testimony whereof, I have hereunto affixed my signature.

IRWIN S. ROSENFELS.